I. N. PYLE.
RAILROAD CAR BRAKE.
No. 39,495.    Patented Aug. 11, 1863.
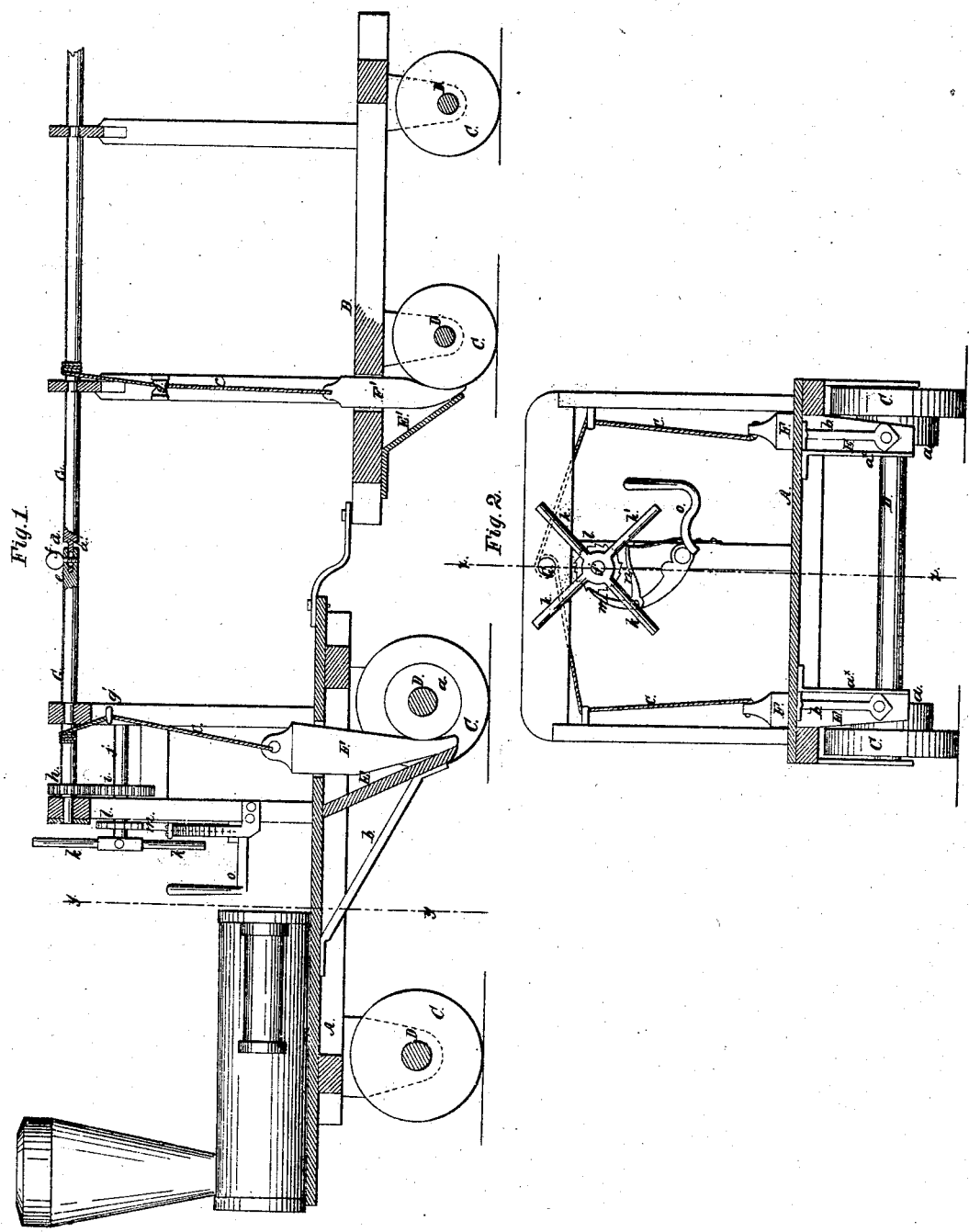
Witnesses.
Inventor.

UNITED STATES PATENT OFFICE.

ISAAC N. PYLE, OF DECATUR, INDIANA.

IMPROVEMENT IN RAILROAD-CAR BRAKES.

Specification forming part of Letters Patent No. 39,495, dated August 11, 1863.

*To all whom it may concern:*

Be it known that I, ISAAC N. PYLE, of Decatur, in the county of Adams and State of Indiana, have invented a new and Improved Car-Brake; and I do hereby declare that the following is a full, clear, and exact description of the same, reference being had to the accompanying drawings, making a part of this specification, in which—

Figure 1 is a vertical longitudinal section of a locomotive and car having my invention applied to them, $x$ $x$, Fig. 2, indicating the plane of section; Fig. 2, a transverse vertical section of the locomotive, taken in the line $y$ $y$, Fig. 1.

Similar letters of reference indicate corresponding parts in the two figures.

This invention relates to a new and improved car-brake for railroad-cars of that class designed to be operated simultaneously on a train of cars, and by the engineer or his attendant.

The invention consists in the employment or use of wedges, connected by chains or ropes to a shaft, which extends the whole length of the train, the wedges being fitted between drums on the axles of the trucks, or the wheels thereof, and inclined plates attached to the trucks, all arranged in such a manner as to operate very efficiently.

To enable those skilled in the art to fully understand and construct my invention, I will proceed to describe it.

A represents a locomotive, and B the framing of a passenger-car.

C are the wheels, and D the axles, arranged or applied in the usual way. On the back axle D of the locomotive there are two drums, $a$, which adjoin the inner sides of the wheels of said axle, and E E are two inclined plates, which are rigidly attached to the locomotive and project down in front of the two drums $a$ $a$, and are firmly braced by rods $b$ $b$. Similar inclined planes, E' E', are attached to the car B, the latter-named plates projecting down in front of the wheels of the front axle of said car.

F represents wedges which are fitted between the inclined plates E E and the drums $a$ $a$ of the back axle D of the locomotive, and F' are similar wedges, which are fitted between the inclined plates E' and the wheels C of the car B. (See Fig. 1.) The wedges F F' are attached by chains or cords $c$ to a shaft, G, which extends longitudinally along the whole train, and has its bearings in the upper parts of the cars, or the framings thereof. This shaft G is formed in sections, each car having a section or length applied to it, and the several sections or lengths are connected by couplings $d$, which may be formed by having the end of one section flattened, as shown at $a'$, and fitted into a socket, $e$, at the end of the adjoining sections, and a pin, $f$, passing transversely through the socket and flattened end $a'$. (See Fig. 1.) Other forms of couplings may be used, however. The chains or cords $c$ pass over pulleys $g$, or through guides $g'$, attached to the sides of the cars, so that said chains or cords may pull or act upon the wedges in a vertical direction, as will be understood by referring to Fig. 2. The chains or cords of each pair of wedges are attached to the shaft G so as to be wound upon it in opposite directions, and thereby insure a simultaneous up or down movement of the wedges F when the shaft G is turned. (See Fig. 2.) The section of the shaft G which is attached to the locomotive A has a pinion, $h$, on its inner end, and this pinion gears into a wheel, $i$, on a shaft, $j$, which has a hand-wheel or radial bars or handles, $k$, secured to it, and which also has a ratchet, $l$, upon it, into which a pawl, $m$, engages, the latter having a spring, $n$, connected to it for the purpose of keeping the pawl engaged with the ratchet, and the former having a crank or handle, $o$, attached to it for the convenience of disengaging the pawl from the ratchet when necessary.

The operation is as follows: When the wheels are free from the wedges F F', the latter are elevated so that they cannot bind between the plates E E' and the wheels and drums previously described. In order to put on the brakes, the shaft C is turned so as to let down the wedges F F' between the plates E E' and the drums and wheels, the wedges being drawn down so as to effectually stop the rotation of the wheels. The drums $a$ are necessary on the axle of the locomotive in consequence of the large diameter of its wheels. They are not required on the axles of the passenger-cars, as the wheels C are sufficiently small to admit of the wedges acting directly upon or against them. By this arrangement it will be seen that the brakes of a train of cars may all be operated simultaneously, and by the engineer or his attendant, simply by turning the shaft $j$, which is connected with shaft G by means of the gearing described. The invention may be constructed and applied at a small cost.

I would remark that plates $a^×$ may be attached to the inner sides of the plates E E' to prevent a lateral movement of the wedges F F'. These, however, I do not consider indispensably necessary.

Having thus described my invention, what I claim as new, and desire to secure by Letters Patent, is—

The wedges F F', in combination with the continuous shaft G and inclined plates E E', the latter being placed in the relation as shown with the wheels C or drums $a$, attached to the axles D thereof, and all arranged as and for the purpose herein set forth.

ISAAC N. PYLE.

Witnesses:
T. T. DORWIN,
CHARLES VANCE.